June 30, 1931.   I. LUNDGAARD   1,812,102
REFRIGERATOR
Filed April 8, 1926
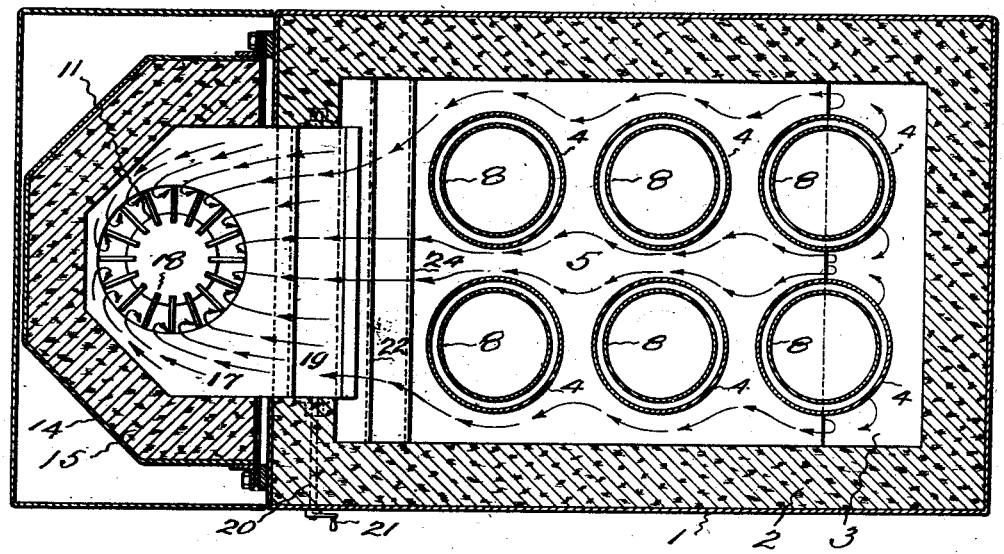
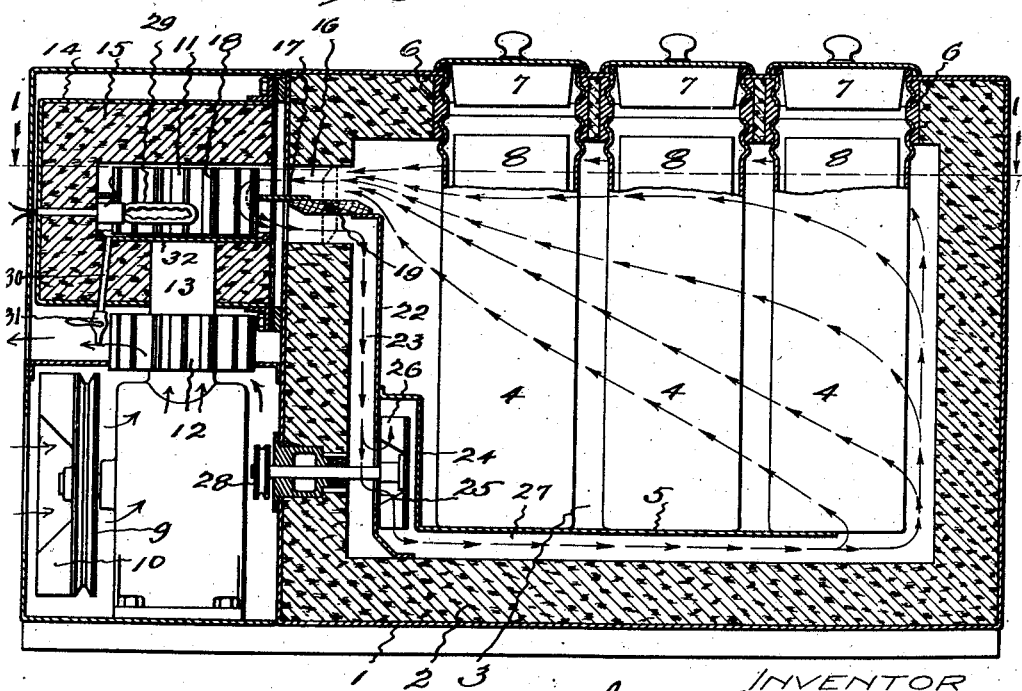
INVENTOR
Ivar Lundgaard
by Harry R. Williams
atty Patented June 30, 1931

1,812,102

UNITED STATES PATENT OFFICE

IVAR LUNDGAARD, OF WEST HARTFORD, CONNECTICUT, ASSIGNOR, BY MESNE ASSIGNMENTS, TO DEVON MANUFACTURING COMPANY, OF BOSTON, MASSACHUSETTS, A CORPORATION OF MASSACHUSETTS

REFRIGERATOR

Application filed April 8, 1926. Serial No. 100,485.

This invention relates to the construction and cooperative relation of the casing and the refrigerating means of a refrigerator of the type in which the space for containing the matter to be maintained at the desired reduced degree of temperature and the refrigerating element containing the refrigerant are both located within a heat insulated casing, and the refrigerating function is effected by a gaseous refrigerating medium that is hermetically sealed within the casing and is circulated about the walls of the receiving space and the refrigerating element so as to convey heat from the former to the latter.

The object of the invention is to produce a refrigerator of this character which may be built at a relatively low cost and which will function very efficiently and economically.

In attaining this end the casing is provided with one or any number of chambers for receiving the food or other products, substances or matter to be refrigerated, the casing walls being heat insulated and hermetically sealed from the outer air, and the food receiving chamber or chambers, while accessible from the outside, being hermetically sealed from the interior of the casing in which they are located. The refrigerating element, containing within it the refrigerant that is also sealed from the refrigerating chamber, is located in the interior of the hermetically sealed casing or in a chamber having air-tight and heat insulated walls communicating therewith. The refrigerating medium which is in the hermetically sealed casing and is employed to absorb heat from the walls of the food chamber or chambers and deliver it to the refrigerating element, is desirably air, while the refrigerating element may be any of the commonly used temperature reducing means, such as an expansion coil, brine tank or ice box, but preferably is a compressing engine in which air is compressed to expel its heat and allowed to expand to draw heat from the refrigerating medium. As a result of this arrangement the gaseous refrigerating medium, which if air is not corrosive, noxious, inflammable or explosive, is caused to circulate about the walls of the refrigerating element and walls of the food receiving chambers with no communication whatever with the external atmosphere; it continuously performs its heat conveying function without change and after its moisture content has been dried out it always remains in the same hygroscopic condition so that no heat-insulating frost can accumulate upon the refrigerating element and cause a reduction in the efficiency of operation.

This refrigerator may be used for refrigerating any desired matter, but for the purpose of illustrating the invention it is shown as in the form of a refrigerator that is particularly designed for keeping ice cream at the desired temperature by the employment of air as the refrigerating medium, which medium is cooled and circulated by a refrigerating element the temperature of which is reduced by the expansion of air in a heat exchange engine, and therefore for the present purpose the invention will be described as embodied in an ice cream refrigerator employing air as the refrigerating medium and an air expansion chamber as the refrigerating element.

In the accompanying drawings Fig. 1 shows a horizontal section of such a refrigerator taken on the plane indicated by the dotted line 1—1 on Fig. 2. Fig. 2 shows a central vertical section of the refrigerator.

In the particular embodiment of the invention illustrated the casing is illustrated as having a sheet metal exterior shell 1 for mechanical protection and ornamental purposes, and an insulating wall 2 preferably of compacted sheets of cork and binder, for reducing the conduction of heat from the outer atmosphere into the refrigerating chamber 3. In the form shown there are six cylindrical sheet metal food chambers 4 entered into the casing and supported on a plate 5 that is arranged a little distance above the bottom of the chamber in the casing. The walls of these food chambers are air-tight and their upper ends are tightly joined to heat insulating sleeves 6 which extend through the top insulating wall and are similarly joined to the metal exterior casing. Removable covers 7 are placed in the food chamber openings for the purpose of keeping them closed. The food or other articles, products, or matter to be refrigerated may be placed packaged or exposed in the food chambers when the covers are removed, but in the drawings there are shown cans 8 such as are commonly used for containing ice cream. As a result of this arrangement the walls of the food containing chambers are hermetically sealed from the refrigerating chamber in the casing and are heat insulated from and hermetically joined to the outer or metallic wall of the casing so that they will rapidly conduct heat from the food chambers to the refrigerating chamber and will not conduct heat to or permit the admission of moisture from the outer atmosphere.

The heat exchange engine illustrated is of the air compressor type shown in Patent 1,240,862 issued to me Sept. 25, 1917, and being fully described in said patent the details are not herein illustrated and described. It is sufficient to state that the compressing means are driven from any suitable source of power by the pulley 9 having fan blades 10, and that the air compressed and expanded therein absorbs heat through the cold head 11 and discharges heat through the hot head 12, the internal air passing from the cold head to the hot head through the interchanger 13, and the heat from the hot head 12 being carried away and dissipated in the outer air by the draft produced by the fan 10, as indicated by the arrows in Fig. 2.

For the purpose of this description the cold head or other means for abstracting heat is termed the refrigerating element, the air within the compressor is termed the refrigerant, the air that circulates around the hot head is termed the cooling medium, and the air or other gaseous fluid that is hermetically sealed in and circulates within the casing about the walls of the food chambers and surface of the refrigerating element is termed the refrigerating medium.

The refrigerating element is, in the construction shown, hermetically sealed within an extension of the casing. This extension has an air-tight exterior metal shell 14 that is removably but tightly fastened to the shell 1 and that has a heat insulating lining 15. The chamber in this extension communicates with the refrigerating chamber in the main casing by passage 16. The chamber in the extension is divided into upper and lower sections by a diaphragm 17 which fits about the refrigerating element in such manner that there is no communication between the upper and lower spaces except between the fins 18 that extend from the refrigerating element. This diaphragm extends into the passage 16, which is further divided into upper and lower sections by a damper 19. By this means the refrigerating medium that circulates in the refrigerating chamber flows through the upper part of the passage and around the top and between the fins of the refrigerating element and back through the lower part of the passage to the refrigerating chamber, as indicated by the arrows. The damper 19 has a shaft 20 that extends to the outside of the casing where it is provided with a crank handle 21 by means of which the damper may be turned so as to close the passage when at any time it is desired to remove or open the extension containing the refrigerating element or to defrost that element and keep the refrigerating medium confined in the refrigerating chamber.

Extending from the damper down to the bottom of the casing, a short distance from one end, is a partition 22 so located as to leave a passage 23 in communication with the lower section of the passage from the chamber containing the refrigerating element. Extending upward from the supporting plate 5 and fastened to the partition 22 is a wall 24. There is an opening 25 through the partition 22 which affords communication from the passage 23 to the passage 27. Adjacent to this opening is a fan 26 the shaft of which extends through the casing and is provided with a pulley 28 by means of which the fan may be rotated. This fan accelerates the circulation of the refrigerating medium in the refrigerating chamber about the walls of the food receptacles and about the refrigerating element, as indicated by the arrows.

As the air which is employed as the refrigerating medium is hermetically sealed within the casing it remains in a uniformly dry condition, but in order to dry it out and remove any moisture it may receive through accident or mischance which becomes frosted on the refrigerating element, an electrical heating element 29 may be placed adjacent to the refrigerating element for liquefying all frost that collects on the refrigerating element. Whatever frost is liquefied by the heating element is collected in a tray 32 from which it can be drained by a pipe 30 with a cock 31. After the refrigerating medium has become once dried it being hermetically sealed always remains dry so that no frost will accumulate on the refrigerating element and thus produce a heat insulator which would materially lower the efficiency of the refrigerating element, and this is of especial advantage where the operation of the compressor is thermostatically controlled by the temperature within the refrigerating chamber.

The use of air as the refrigerating medium is advantageous as it costs nothing, does not add to the weight of the apparatus, is odorless, is not corrosive, is not noxious, poisonous, or inflammable, and does not involve handling or maintenance. Air, however, cannot be efficiently used as a refrigerating medium for conveying heat from the walls of a food chamber to the surface of a refrigerating element without precaution being taken to prevent the accretion of moisture from the surrounding atmosphere. This is particularly true where temperatures substantially below the freezing point must be constantly maintained, as is the case in ice cream refrigerators.

Atmospheric air contains moisture which condenses whenever its temperature is lower than dew point and freezes when it drops below freezing point. The refrigerating surface of the refrigerating element must be held at low temperatures, and if external atmospheric air has access to the refrigerating surface the result inevitably is that such surface progressively becomes coated with ice and loses efficiency. With a compressor under thermostatic control there naturally is somewhat of a variation of the pressure or volume of the conveying air. Should the walls of the casing be open to the outer atmosphere this variation would cause alternate ingress and expulsion of air, each inspiration depositing its moisture contents on the refrigerating element until the accumulation materially reduced its refrigerating capacity so that even though the heat exchange engine should run constantly its effect would be insufficient. Therefore, in order to obtain and maintain in a cheap and satisfactory manner a commercially efficient apparatus the invention herein described resulted, an essential feature of which is the employment of a gaseous (air being considered gas) refrigerating medium for conveying heat from the wall of the food receiving chamber to the surface of the refrigerating element, this refrigerating medium being hermetically sealed in the casing and having a circulation about the sealed wall of the food chamber and the sealed surface of the refrigerating element so that the hygroscopic condition of the refrigerating medium always remains the same and frost will not collect upon the refrigerating element and reduce its efficiency.

Furthermore when such gaseous refrigerating medium is dried out and remains dry, as when it is enclosed within a hermetically sealed exterior casing, it is not necessary to provide a metallic protecting shell inside of the heat insulating lining, for if the medium contains no moisture that insulation is not subject to the destructive action of frost. Since there can be no circulation of humid air through the joints in the insulating walls, these need not be sealed up or otherwise cemented beyond the needs of mechanical durability. The economies due to the elimination of the customary inner metal lining and the cementing of cork joints constitutes an important feature of this invention.

The invention claimed is:—

1. A refrigerator comprising a hermetically closed casing containing a refrigerating chamber and a food chamber, said food chamber being accessible from the exterior but hermetically closed from the refrigerating chamber, a refrigerating element within said casing, a heating element for defrosting the refrigerating element and a gaseous refrigerating medium sealed within the refrigerating chamber and designed to circulate in thermal contact with the wall of the food chamber and surface of the refrigerating element.

2. A refrigerator comprising a hermetically closed casing containing a refrigerating chamber and a food receiving chamber, said food chamber being accessible from the exterior but hermetically closed from the refrigerating chamber, a heat exchange engine with its cold head within said casing, and a gaseous refrigerating medium sealed within the refrigerating chamber and designed to circulate in good heat conductive relation with the wall of the food chamber and surface of said cold head.

3. A refrigerator comprising a hermetically closed main casing containing a refrigerating chamber and a food chamber, said food chamber being accessible from the exterior but hermetically closed from the refrigerating chamber, a refrigerating element located within a heat insulated air-tight casing removably secured to said main casing, the chambers in said casings being in communicating with each other, and a gaseous refrigerating medium sealed within the refrigerating chamber and designed to circulate in thermal contact with the wall of the food chamber and surface of the refrigerating element and means selectively operable for abstracting moisture from the gaseous medium.

4. A refrigerator comprising a hermetically closed casing containing a refrigerating chamber with re-entrant food receiving chambers, said food chambers being accessible from the exterior but hermetically closed from the refrigerating chamber, a heat exchange engine with its cold head within said casing, and a gaseous refrigerating medium sealed within the refrigerating chamber designed to circulate in thermal contact with the walls of the re-entrant food chambers and surface of said cold head.

5. A refrigerator comprising a hermetically closed casing containing a refrigerating chamber and a food receiving chamber, said food chamber being accessible from the exterior but hermetically closed from the refrigerating chamber, a refrigerating element within said casing, a gaseous refrigerating medium sealed within the refrigerating chamber and designed to circulate in thermal contact with the wall of the food chamber and surface of the refrigerating element, a heating element for defrosting the refrigerating element, a tray for collecting moisture resulting from defrosting, and means for draining moisture from said tray.

6. A refrigerator comprising a hermetically closed refrigerating chamber and a food chamber, the latter being accessible from the exterior but sealed from the refrigerating chamber, a refrigerating element located in heat conductive relation to the refrigerating chamber, a gaseous refrigerating medium sealed within the refrigerating chamber, and a fan within the chamber for circulating the gaseous medium, whereby heat from the food chamber is conveyed to the refrigerating element.

7. A refrigerator comprising a hermetically closed refrigerating chamber and a food chamber, the latter being accessible from the exterior but sealed from the refrigerating chamber, a refrigerating element containing a cooling fluid located in a portion of the refrigerating chamber, said chamber containing a gaseous refrigerating medium sealed therein, and a fan within the chamber for circulating the gaseous medium, whereby heat from the food chamber is conveyed to the refrigerating element.

8. A refrigerator comprising a hermetically closed refrigerating chamber and a food chamber, the latter being accessible from the exterior but sealed from the refrigerating chamber, a refrigerating element containing a cooling medium located in a portion of the refrigerating chamber, said chamber containing a gaseous refrigerating medium sealed therein, and a fan within the chamber for circulating the gaseous medium, whereby heat from the heat chamber is conveyed to the refrigerating element, and a damper adjoining the cooling element to permit a ready variation in the difference between the temperature of the same and the food compartment.

9. A refrigerator comprising a hermetically closed refrigerating chamber and a food chamber, the latter being accessible from the exterior but sealed from the refrigerating chamber, a refrigerating element containing a cooling medium located in a portion of the refrigerating chamber, said chamber containing a gaseous refrigerating medium sealed therein, and a fan within the chamber for circulating the gaseous medium, said chamber being divided by a partition to direct the gaseous medium past one wall portion of the food chamber as it flows away from the cooling element and past another wall portion on its flow back toward the element.

10. A refrigerator comprising a closed refrigerating chamber and a food chamber, the latter being accessible from the exterior but sealed from the refrigerating chamber, a heat exchange engine employing air as a mediating fluid, said engine having a cold end within the refrigerating chamber, heat conductive means disposed about the cold head to transmit heat to the mediating air, said refrigerating chamber having a normally fixed body of air therein, and a fan for circulating said body of air about the heat conductive means.

IVAR LUNDGAARD.